US006171111B1

(12) United States Patent
Buckner

(10) Patent No.: US 6,171,111 B1
(45) Date of Patent: Jan. 9, 2001

(54) EDUCATIONAL DEVICE FOR ILLUSTRATING MATHEMATICAL RELATIONSHIPS

(76) Inventor: Harry Buckner, 2140 Sycamore, Apt. 3, Louisville, KY (US) 40206

(*) Notice: Under 35 U.S.C. 154(b), the term of this patent shall be extended for 0 days.

(21) Appl. No.: 09/548,840

(22) Filed: Apr. 13, 2000

Related U.S. Application Data

(60) Provisional application No. 60/131,215, filed on Apr. 27, 1999.

(51) Int. Cl.[7] .................................................. G06C 1/00
(52) U.S. Cl. ........................................... 434/203; 434/175
(58) Field of Search .................................. 434/203, 204, 434/210, 83, 113, 171, 172, 173, 174, 175, 205, 208, 216; D18/6; 446/227, 228; 601/94, 110, 113, 122, 127, 128, 131

(56) References Cited

U.S. PATENT DOCUMENTS

| | | | | |
|---|---|---|---|---|
| 345,445 | * | 7/1886 | Pelletier | 434/203 |
| 690,664 | * | 1/1902 | Proctor | 434/175 |
| 1,240,556 | * | 9/1917 | Fox | 434/175 |
| 3,811,205 | * | 5/1974 | Pitzler | 434/203 |
| 4,008,715 | * | 2/1977 | Brodbeck | 601/128 |
| 4,295,832 | | 10/1981 | Karell . | |
| 4,884,973 | | 12/1989 | Pak . | |
| 4,993,952 | | 2/1991 | Yeh . | |
| 5,205,747 | | 4/1993 | Tan . | |
| 5,772,615 | * | 6/1998 | Elder et al. | 601/122 |

* cited by examiner

Primary Examiner—Sam Rimell
(74) Attorney, Agent, or Firm—John E. Vanderburgh

(57) ABSTRACT

A device and method for demonstrating number theory is disclosed in which the device comprises a frame consisting of the plurality of spaced parallel rods which are secured at their ends to transverse members. The rods carry slidable members which are arranged to define an triangle having the same number members on each side. The rods are spaced apart and the members are sized so that sliding movement of one bead will contact a bead located in the next adjacent rod and cause it to also slide. A member representing an ordinal number is selected and is moved along the rod to contact members adjacent to the selected member in the direction of movement to separate a sub-array of members from said equilateral triangle array. The selection of additional ordinal members contact with adjacent members is repeated so that depending upon the mathematical operation being demonstrated. Depending on location of selected base member being manipulated, some or all of the members in the equilateral triangle are moved simultaneously. The resulting array of members visually demonstrates the results of the mathematical principle applied to the triangle. The resulting array also provides the student the correct answer in response to the query.

6 Claims, 5 Drawing Sheets

EDUCATIONAL DEVICE FOR ILLUSTRATING MATHEMATICAL RELATIONSHIPS

CROSS REFERENCE TO RELATED APPLICATIONS

This application claims the benefit of Provisional Application Serial No. 60/131,215, filed Apr. 27, 1999 by Harold Buckner for EDUCATIONAL DEVICE FOR ILLUSTRATING MATHEMATICAL RELATIONSHIPS.

FIELD OF THE INVENTION

The present invention and relates to educational devices and more particularly to educational devices for teaching mathematics to students.

BACKGROUND OF THE INVENTION

For the teaching of mathematics, particularly to beginning students in the lower grades, a number of devices have been proposed to help those students visualize the mathematical activity being taught. For example U.S. Pat. No. 4,894,973 is designed to aid in teaching of children to add and subtract. This device requires a teacher to place certain panels on the base of the unit after which the student can manipulate beads in response to the mathematical activity set up by the teacher.

In yet another device, shown in U.S. Pat. No. 5,205,744, a spaced series of U shaped rods are disposed on a base. The rods carry slidable counting beads on all but two of the rods. These two rods are provided with sign beads for indicating the mathematical function being performed. Manipulation of the beads allows students to visualize subtraction, addition, multiplication and division by seeing the number of beads on the rods involved in the mathematical operation.

These devices, although suitable for simple mathematical functions, are limited in their representations of mathematical functions. For example, they're unable to visually represent the result of the mathematical manipulation of two numbers unless the beads are first arranged by the instructor. Indeed, unless the instructor arranges the proper number of beads, the student is may not accurately arrive at and see the results of the mathematical functions being demonstrated. In addition, these devices are not sophisticated enough to demonstrate number theory and relationships.

SUMMARY OF THE INVENTION

The device of the present invention is a teaching device which serves both to illustrate number theory and mathematical functions and which also is able to calculate the correct response without the necessity of the instructor first manipulating the device to illustrate the proper result. Thus, the student is able to see the effect of various mathematical procedures and is also able to carry out simple calculations.

In accordance with the invention the device comprises a frame consisting of the plurality of spaced parallel rods which are secured at their ends to transverse members. The rods carry slidable members, such as beads, which are arranged to define an triangle having the same number members on each side. The rods are spaced apart and the members are sized so that sliding movement of one bead will contact a bead located in the next adjacent rod and cause it to also slide. The contact and sliding of the members is repeated so that depending upon the location of selected base bead being manipulated, some or all of the members in the triangle are moved simultaneously. Selection and manipulation of the base bead maybe repeated with a second selected bead and the resulting array of members visually demonstrates the results of the mathematical principle applied to the triangle. The resulting array also provides the student the correct answer in response to the query.

By arranging the members as an equilateral triangle, the device of the invention illustrates the mathematical principles of observed and propounded by Pythagorus. The device is able to demonstrate visually many Pythagorean theorems concerning number theory and number relationships. The device of the invention is distinguished from the abacus in that the members of the abacus slide independently of one another whereas it in the present device the members normally do not slide independently but in association with members on adjacent rods as will more clearly demonstrated below in connection with the Figures.

DESCRIPTION OF THE PREFERRED EMBODIMENT

Figure 1:
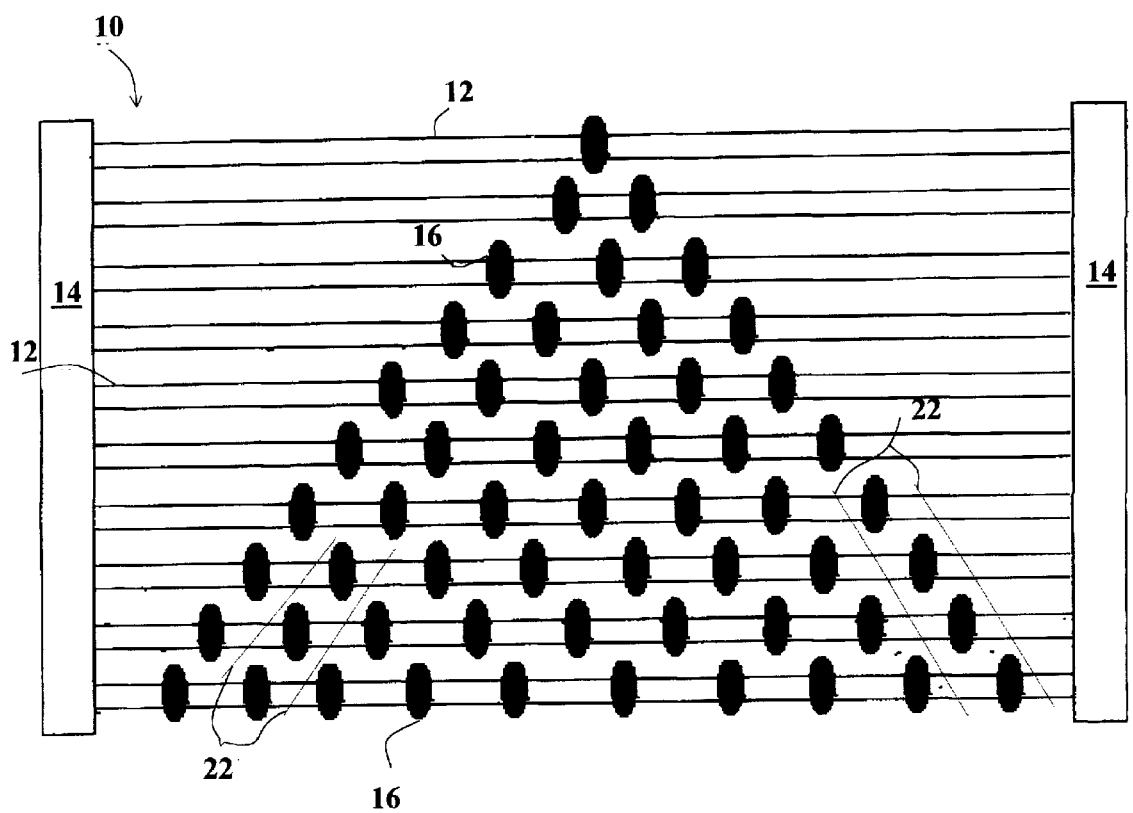
FIG. 1 is an illustration of the device of the present invention having 10 members on each side of an equilateral triangle.

As illustrated in FIG. 1, the device of the present invention, shown generally as 10 comprises a frame defined by a plurality of parallel running, spaced apart rods 12 supported at their ends by transverse members 14. Each rod 12 contains a roll of members 16 slidably disposed thereon. The members 16 are arranged in a triangular configuration defining a base 18 and two sides 20. As illustrated, the base roll, that is the roll of members 16 defining the base 18 of the triangular configuration contains ten members 16 and each roll toward the apex of the triangle is reduced by one bead. As shown, the frame contains ten rods 12 so that the base 18 and sides 20 of the triangle each contain ten members 16. It will be understood that the number of members 16 in the base roll and the number of rods 12 in the frame are equal so the total bead array defines a triangle having equal sides 20 and base 18. Thus the base roll and the number of rods 12 may be increased to 20 or more depending on the magnitude of the numbers to be dealt with.

In the triangular configuration the members 16 also define columns 22 and 22' which extend parallel to sides 20 of the triangle. The rods 12 are spaced apart and the members 16 of each roll fit between the members of the rolls on adjacent rods 12 above and below so that a selected bead will contact the bead above and below it and no bead, except for the members at the very tips of the triangle, or other array of members as will be explained below, move independently.

The device 10 to the present invention operates in accordance with mathematical relationships discovered by Pythagorus. Although in some respects the device 10 resembles a Chinese abacus, it is readily distinguished therefrom. The members and the rows of members of the Chinese abacus moved independently while, as mentioned above, the rolls of members 16 of the present invention do not to move independently.

Figure 2:
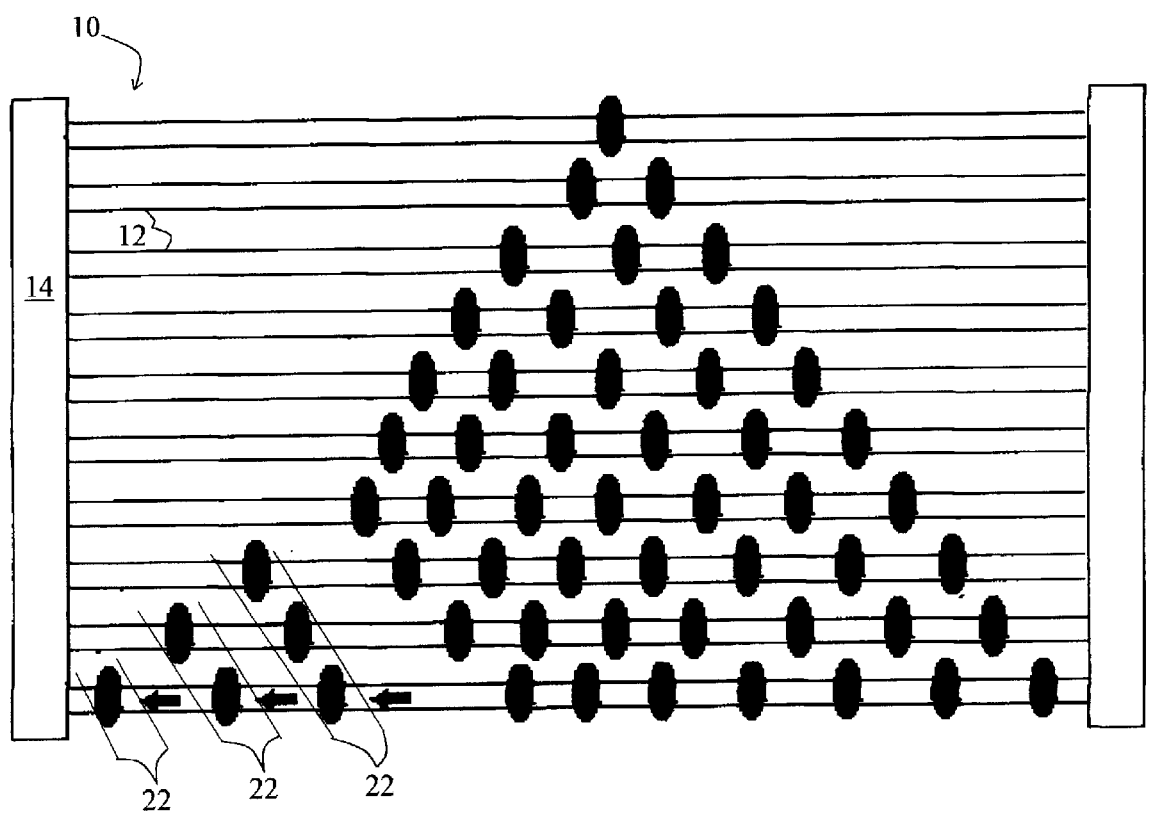
FIG. 2 illustrates the use of the device of the invention to demonstrate counting.

The properties of the triangular array and the mechanical structure of the teaching device 10 produces a correspondence of ordinal and cardinal numbers. As illustrated in FIG. 2, displacing the members 16 of the base roll on the bottom rod 12 one by one in order displaces successive columns 22 of members. The number of members 16 in the successive columns 22 increases by one revealing the correspondence of ordinal and cardinal numbers. The first column 22 includes one bead, the second column includes two members and so on demonstrating counting from 1 to n.

Figure 3:
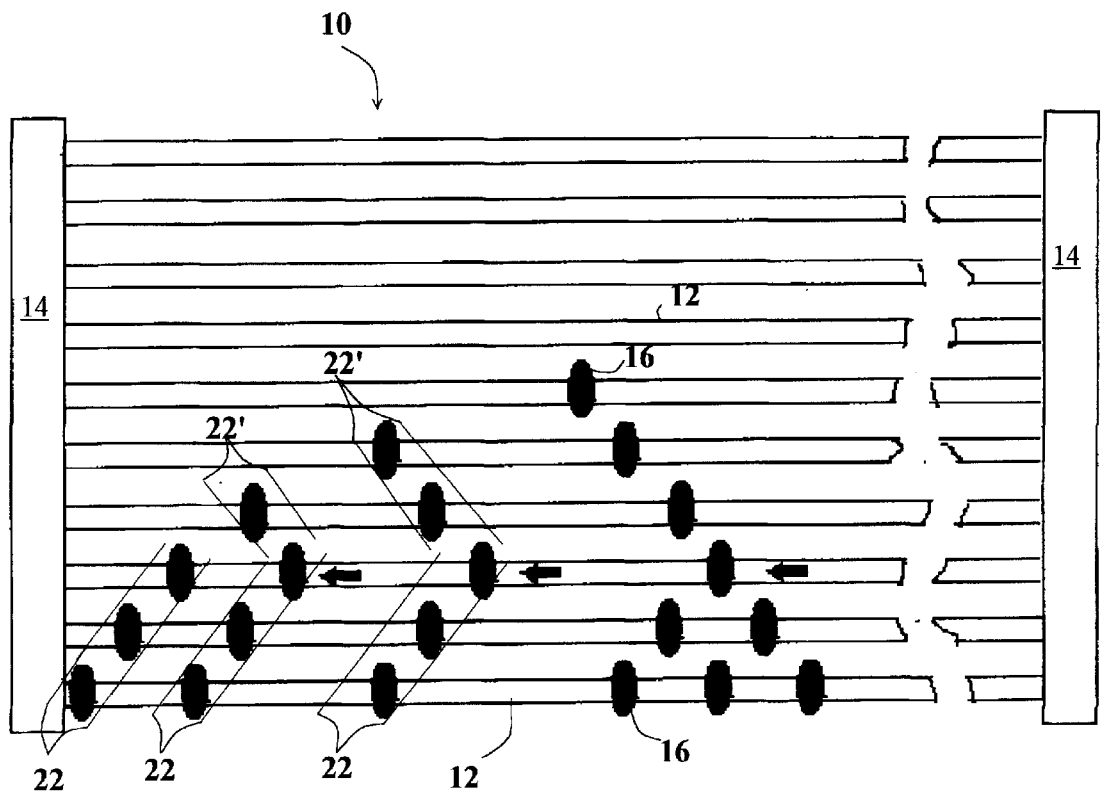
FIG. 3 illustrates the use of the device of the invention to demonstrate addition.

As shown in FIG. 3 addition can be demonstrated by selecting any rod 12 other than the rod at the base 18. For example, one may start with the third bead 16 of the third rod 12 which will select three members. Manipulating the next bead 16 of the third rod 12 selects 4 members and so forth. It will be seen that the first array of members defines a column 22 equal to the starting number, i.e. 3. Selecting the next bead 16 on the third rod 12 provides a bead array that is angular and consists of a lower leg 24 consisting of a portion of a column 22 and an upper leg 26 consisting of a portion of a column 22'. The array has its vertex located on the starting rod, i.e. rod number 3. The lower leg 24 contains the number of members 16 equal to the starting number (3) while the members in the upper leg 28 are equal to number added to the starting number. The total number of members 16 in the array equals the sum of the addends. Thus in the second array one bead 16 is located above the vertex to provide a total of 4 members. The second array has 2 members 16 above the vertex to provide a column total of 5 members. In this manner the student is able to visualize the effect of adding numbers.

Figure 4:
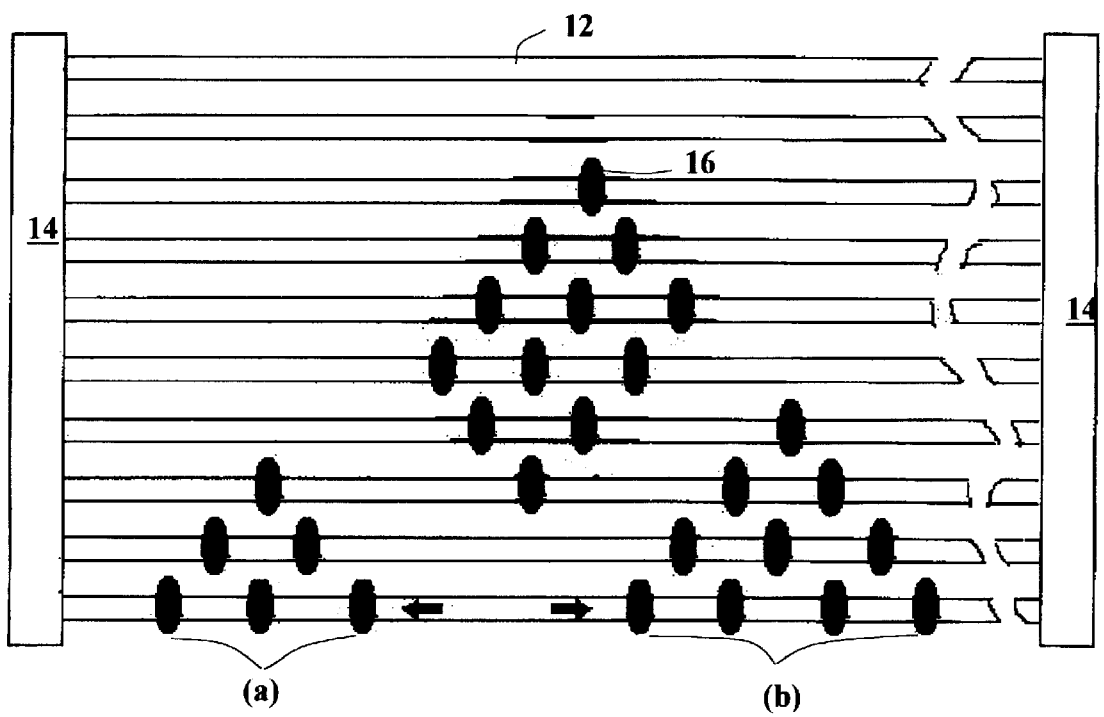
FIG. 4 illustrates the use of the device of the invention to demonstrate multiplication.

Referring to FIG. 4, the use of the device 10 of the present invention to illustrate multiplication is shown. A given triangular array may be partitioned into two smaller triangular arrays (a) and (b) leaving between the two smaller arrays a rectangular array of members. The total number of members in the rectangular array will equal the product of the number of members in the base of the triangular arrays. Thus, for example, to illustrate the product of 4 multiplied by 3, one counts in seven members 16 of the base roll (FIG. 1) and slides the seventh bead to the left pulling out a large triangular array of members. Then counting right three members 16 on the base roll, the third bead is moved to the left forming the smaller triangular array (a). The remaining 4 members of the base roll are moved to the right to form the second triangular array (b) leaving in the center a rectangular array containing 12 members, the product of 4 multiplied by 3.

Figure 5:
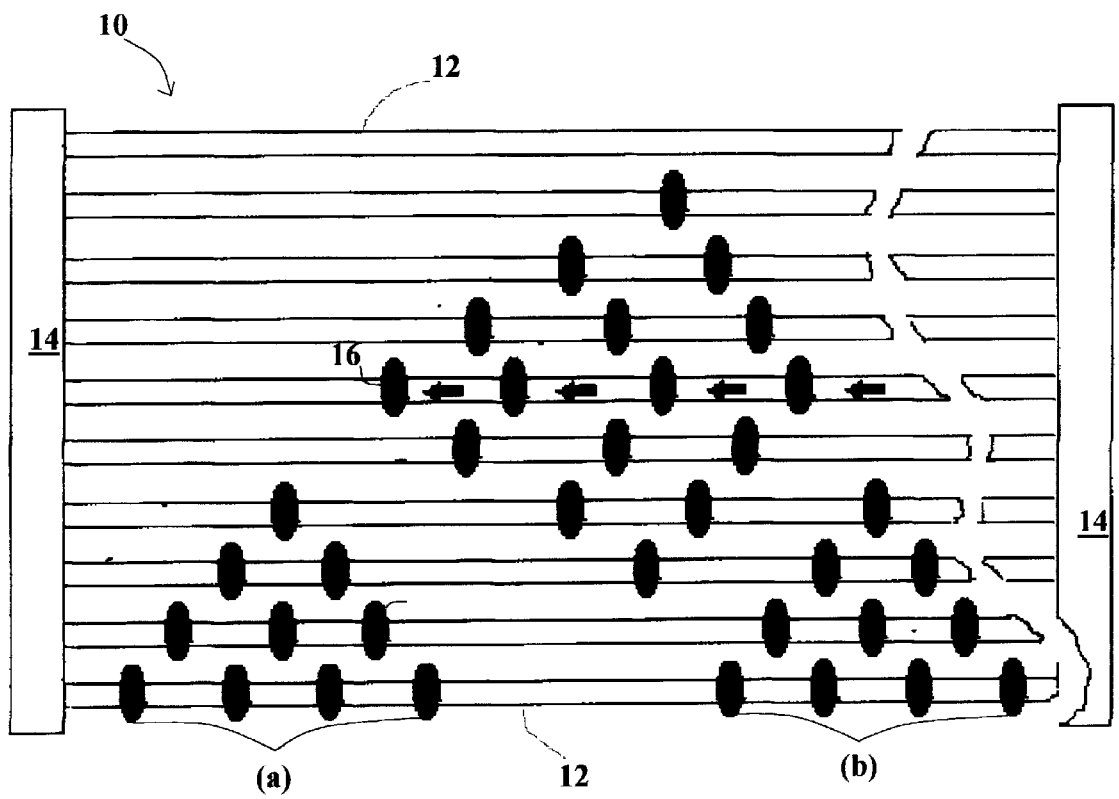
FIG. 5 illustrates the use of the device of the invention to demonstrate the relationship of numbers within the square of a number.

Referring to FIG. 5, certain relationships between numbers are demonstrated using the device 10 of the present invention. For example, following the multiplication procedures discussed above in connection with FIG. 4, the square of 4 is produced by selecting eight members 16 (4 and 4) from the roll of members on the base rod 12 and separating the eight members from the rest of the triangle. The first 4 members 16 from the left on the base roll are moved to the left to produce a triangle array (a). The remaining four members 16 are moved to the right to produce a second triangle array (b). A square array of 16 members is formed between the triangle arrays (a) and (b).

To illustrate the relationship of numbers in the square of a number, the middle bar of the square array is selected and the left most bead 16 is moved to the left. The next bead 16 on the middle bar is moved left to form an array of three members having a lower leg consisting of a portion of a column 22 and an upper leg formed by a portion of a column 22'. The next bead 16 on the middle bar 12 of the square array is moved to the left to produce an array of five members. The remaining array consists of seven members. It can then be seen that the square of 4 consists of the sequence of the odd numbers one, three, five and seven. Considering the left most single bead 16 as 1 and then considering the next bead on the middle rod 12 as 1, it is demonstrated that the relationship of numbers within a square of a number is 1 (represented by the single bead) through 2n+1 where n equals the position of the array forming members 16 on the middle rod.

In describing the operation of the device 10 of the present invention the main triangle was located on the right hand side of the frame. Consequently operations start by moving the selected members 16 first to the left in order to separate the members involved in the function from the main triangle. It will be understood, however, that if the triangle is located on the left hand side of the frame, operation of the device 10 will begin by moving the selected members to the right. Regardless of whether the members 16 are moved to the left or to the right the result of the operation is the same.

From the foregoing a can be seen how the educational mathematical the voice of the presence invention can be employed to illustrate addition multiplication and relationships between numbers. By illustrating it these various functions in the form of a physical demonstration, the student is better able to grasp the concepts been taught.

What is claimed is:

1. Apparatus for teaching and demonstrating mathematical relationships, said apparatus comprising:

a. a frame consisting of a plurality of spaced apart parallel rods secured at each of their ends by a transverse member;

b. a plurality of members slidably carried by said rods, each of said rods carrying a different number of members than each other of said rods whereby an array of said members on said frame defines an equilateral triangle having a base and an apex the spacing between rods being such that sliding movement of a member will result in contact of that member with a member on an adjacent rod to produce sliding movement of the contacted member.

2. The apparatus of claim 1 wherein said frame defines a rectangle and said members on each of said rods define a roll of members, said roll of members on one of said lateral edge rods of said frame carries a maximum number of members to form the roll of members defining the base of said equilateral triangular array of members and said other lateral edge rod carries a single member to define the apex of said triangular array of members, each roll of members from said base to said apex of said triangular array being reduced by one member.

3. The apparatus of claim 1 wherein the number of said rods in said frame carrying members is equal to the number of members in said roll of members defining the base of said equilateral triangular array of members.

4. The apparatus of claim 1 wherein said roll of members defining the base of said equilateral triangle consists of 10 members.

5. The apparatus of claim 1 wherein said roll of members defining the base of said equilateral triangle consists of 20 members.

6. A method for demonstrating number relationship and theory, said method comprising the steps of:

a. positioning a plurality of members in an array defining an equilateral triangle, said members being slidably carried by elongated rods secured in a frame, the number of members on each said rod being one member different from the number of members on each of said adjacent rods, said rod having the greatest number of members defining the base of said equilateral triangle, said rods being spaced apart for contact between members on a rod with members on adjacent rods;

b. selecting a member representing an ordinal number and sliding said selected member in a direction to contact members adjacent to said selected member in the direction of movement to separate a sub-array of members from said equilateral triangle array; p1 c. repeating step b. as required to select additional members representing ordinal numbers to complete the mathematical procedure;

whereby the properties of the sub-arrays and the array formed by the members remaining from said original equilateral triangle array demonstrate the relationship between numbers involved in a given mathematical operation.

* * * * *